United States Patent
Goldberg et al.

[11] Patent Number: 6,023,855
[45] Date of Patent: Feb. 15, 2000

[54] AIR-ASSISTED WIPING DEVICE

[75] Inventors: Neil M. Goldberg, North Wales; Charles I. Onwulata, Wyndmoor; Philip Wayne Smith, Pennsburg, all of Pa.; Greg Tomes, Lucedale, Miss.

[73] Assignee: The United States of America as represented by the Secretary of Agriculture, Washington, D.C.

[21] Appl. No.: 08/758,026

[22] Filed: Nov. 27, 1996

[51] Int. Cl.[7] ..................................................... F26B 17/00
[52] U.S. Cl. ................. 34/576; 15/246.5; 34/372
[58] Field of Search ............................ 34/372, 373, 374, 34/576; 15/246.5; 366/309, 312

[56] References Cited

U.S. PATENT DOCUMENTS

| | | |
|---|---|---|
| 3,905,790 | 9/1975 | Strickland . |
| 4,095,307 | 6/1978 | Brubaker ................................ 15/246.5 |
| 4,950,433 | 8/1990 | Chiu . |
| 5,632,100 | 5/1997 | Hansen ...................................... 34/374 |

OTHER PUBLICATIONS

Anon., Chemical Engineering, 79: 64, 1982.

*Primary Examiner*—Henry Bennett
*Assistant Examiner*—Malik N. Drake
*Attorney, Agent, or Firm*—M. Howard Silverstein; John D. Fado; Janelle S. Graeter

[57] ABSTRACT

The invention provides an air-assisted wiping device for use in a continuous-spray dryer. The air-assisted wiping device rotates inside the housing to continuously wipe heavy sticky powder from the walls of the housing using a wiper blade. The air-assisted wiping device includes an elongated hollow plenum having a flow-directing slot disposed along its length. Air received into the elongated hollow plenum is passed through the flow-directing slot onto a wiper blade, which is coupled to the elongated hollow plenum. The air discharged onto the wiper blade removes powder that collects on the leading side of the wiper blade.

16 Claims, 6 Drawing Sheets

AIR-ASSISTED WIPING DEVICE

BACKGROUND OF THE INVENTION

1. Field of the Invention

The invention relates to an air-assisted wiping device. More particularly, the invention relates to an air-assisted wiping device for wiping the inside walls of a continuous-type spray dryer.

2. Description of the Related Art

In the food industry, dryers are used in the manufacture of powders. Liquid products of various viscosities and stickiness are introduced into the dryer through the use of an atomizer. As a result of gravity, the atomized liquid passes through the dryer and the atomized liquid is flashed into powder.

There are primarily two types of dryers used in the industry, a batch dryer and a continuous spray dryer. The batch dryer is often referred to as a box dryer because it is essentially a box-shaped housing having an inlet at the top and an outlet at the bottom. The products are produced in finite batches rather than continuously as in the continuous spray dryers. The air in the batch dryer housing is heated by conventional techniques. The fluid product is input into an atomizer at the inlet of the box and is atomized into a fine mist, which disperses into the heated air inside the housing. The atomized liquid falls through the housing from the top to the bottom due to gravity. As the atomized liquid passes through the heated air in the housing, the heat in the dryer flashes away the moisture in the atomized liquid. As a result, by the time atomized liquid reaches the bottom of the housing, it is in a dried powder form. The dried powder falls out of the bottom of the batch dryer and collects in an area below the batch dryer. The collected powder is then transported to the next stage of manufacturing by, for example, shoveling.

During operation of the batch dryer, the powder collects on the walls of the housing. If the powder remains the walls for an extended period of time, it will become scorched and effect the quality of the powder produced. Although powder collects on the walls of the housing during the production of all types of powders, the collection is especially high and the collected powder especially difficult to remove when heavy sticky powders are being manufactured.

This problem occurs in both batch and continuous dryers, however, the removal of the powder from the walls differs for each type of dryer. In the batch dryer, the dryer walls are manually cleaned after each batch by conventual techniques such as scraping, thus the use of the batch dryer is labor intensive.

The continuous spray dryer is usually of a cylindrical shape, having a funnel or conical-shaped discharge end for channeling the powder into a discharge chute. The liquid is atomized and dried inside the housing in a manner similar to the batch dryer. However, this type of dryer operates continuously to both manufacture discharge powder through the chute at a bottom end of the funnel-shaped discharge end. This continuous-type dryer can be used continuously because an air broom is provided in an attempt to continuously clean the inside of the walls. The conventional air broom used in continuous spray dryers consists of an elongated hollow pipe that has a blunt open end or a series of openings along a side of the pipe that is positioned adjacent to the inside wall of the housing. The air broom is moved over the inside walls of the housing. The streams of air expelled from the openings blow on the inside walls of the continuous spray dryer in an attempt to blow off the powder that has collected on the inside walls of the housing.

Use of the conventional continuous spray dryer, however, is limited to light-weight, non-sticky liquid products because the heavy sticky types of powder tend to collect on the wall and cannot be removed by conventional cleaning techniques used in the continuous spray dryers. The quality of the powder is therefore compromised and inferior since the powder sticks to and cannot be removed from the walls. Heavy sticky powders are therefore conventionally manufactured in the batch dryers, which can be manually cleaned after each batch.

Some examples of such heavy sticky products include butterfat, high carbohydrate and/or high acid powders such as acid cheese whey, acid casein, caseinates and potato waste water.

SUMMARY OF THE INVENTION

We have discovered a means of overcoming these problems by providing a device that enables the continuous manufacture of high-grade, heavy sticky powders in continuous spray dryers.

In accordance with this discovery, it is an object of the invention to provide an air-assisted wiping device for use in a continuous spray dryer for effectively and efficiently removing heavy sticky powder that collects on the inside surface of the dryer housing. With the present invention, heavy sticky products can now be manufactured successfully into high grade quality powder in the continuous spray dryers.

The wiping device of the present invention includes an elongated hollow plenum having an open distal end for receiving a fluid flow, and a closed distal end opposite the open distal end for preventing the exit of the fluid flow at the closed distal end. A flow directing slot is disposed along a side of the elongated hollow plenum. The fluid flow inside the elongated hollow plenum exits from the elongated hollow plenum through the flow directing slot along a flow path. A wiper is coupled to the elongated hollow plenum. The wiper is drawn across the inside surface of the dryer housing to remove powder that has collected thereon. The wiper is positioned on the elongated hollow plenum in the flow path. Accordingly, the fluid flow exiting from the flow directing slot removes the powder that collects on the wiper.

Another object of the invention is to provide a dryer for producing powder. The wiping device of the present invention is provided to rotate inside the housing and continuously wipe heavy sticky powder from the housing walls.

The invention is advantageous in that it provides for the continuous manufacture of heavy, sticky powder in a continuous spray dryer.

It provides an improved quality powder that may be promptly removed from the dryer walls.

It also provides for improved efficiency by eliminating prolonged heating of the powder in the dryer, providing for a greater yield of powder, reducing manual labor in the production of heavy, sticky powders, and it can be retrofitted onto existing air devices in continuous spray dryers.

Other objects and advantages of the invention will become apparant from the following description.

BRIEF DESCRIPTION OF THE DRAWINGS

The present invention is described with reference to the accompanying drawings. In the drawings, like reference numerals indicate identical and functionally similar elements.

DETAILED DESCRIPTION OF THE INVENTION

Figure 1:
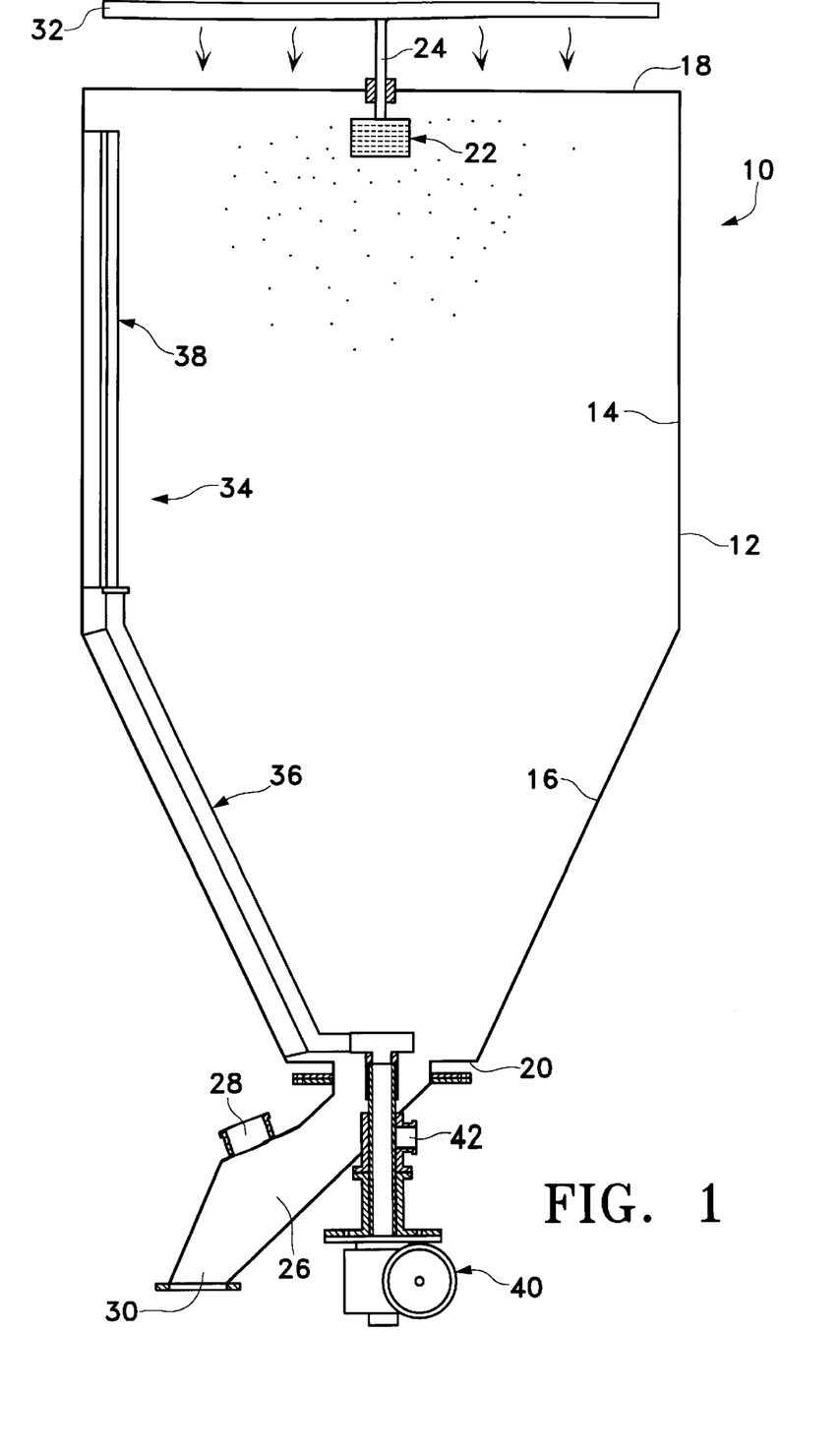
FIG. 1 shows an embodiment of the air-assisted wiping device of the present invention provided in a continuous-type dryer.

Referring to FIG. 1, the invention will be described for use in a continuous spray dryer shown generally at 10. Dryer 10 includes a housing 12 having a generally cylindrical main portion 14 and a funnel or conical portion 16 positioned below main portion 14. At a top of housing 12 is an atomizing end 18 and at a bottom of housing 12, opposing the top of housing 12, is a discharge end 20. An atomizer 22 is disposed at atomizing end 18. Atomizer 22 has an inlet 24 for transporting a liquid, which is to be manufactured into powder, therethrough. The liquid is atomized into a fine mist as it passes through atomizer 22 in accordance with conventional practice. The atomized liquid is dispersed into heated air inside housing 12.

At discharge end 20, a direct gravity take off shown as discharge chute 26 is included. Relying on gravity, discharge chute 26 passes the powder manufactured in, and received from, housing 12 to a next stage in the process via a conduit or a conveyor belt (neither shown). The conduit or conveyor belt is positioned at an outlet mouth 30 of discharge chute 26. Discharge chute 26 may include an air return outlet 28 connected to an air cleaner, such as a cyclone, to scavenge out excess powder remaining in the air.

The air inside housing 12 is heated by a heater 32 in accordance with conventional practice. Housing 12 has vents (not shown) for receiving heat (shown by arrows) generated by heater 32. The temperature of the air inside the housing is regulated in accordance with conventional practice, and may vary depending upon the powder that is being manufactured.

In operation, the atomized liquid is dispersed into the air in housing 12 by atomizer 22, and drifts downwardly through the housing due to gravity. As the atomized liquid passes through the heated air inside housing 12, the moisture is flashed from the atomized liquid. At discharge end 20, the moisture is removed from the atomized liquid and the final product is a dry powder, which is discharged through discharge chute 26. Conical portion 16 is intended to assist in directing the powder into discharge chute 26.

During atomization and drying in housing 12, powder collects on the inside surface of the walls of housing 12. This collection of powder is amplified when heavy sticky powders are manufactured. Accordingly, the present invention provides a wiper shown generally at 34 that is capable of cleaning and removing powder collected on the inside surface of the walls of housing 12, regardless of the weight and stickiness of the powder being manufactured. Accordingly, with the present invention, a continuous spray dryer can be used to manufacture not only light non sticky powders, but also heavy sticky powders.

Figure 2:
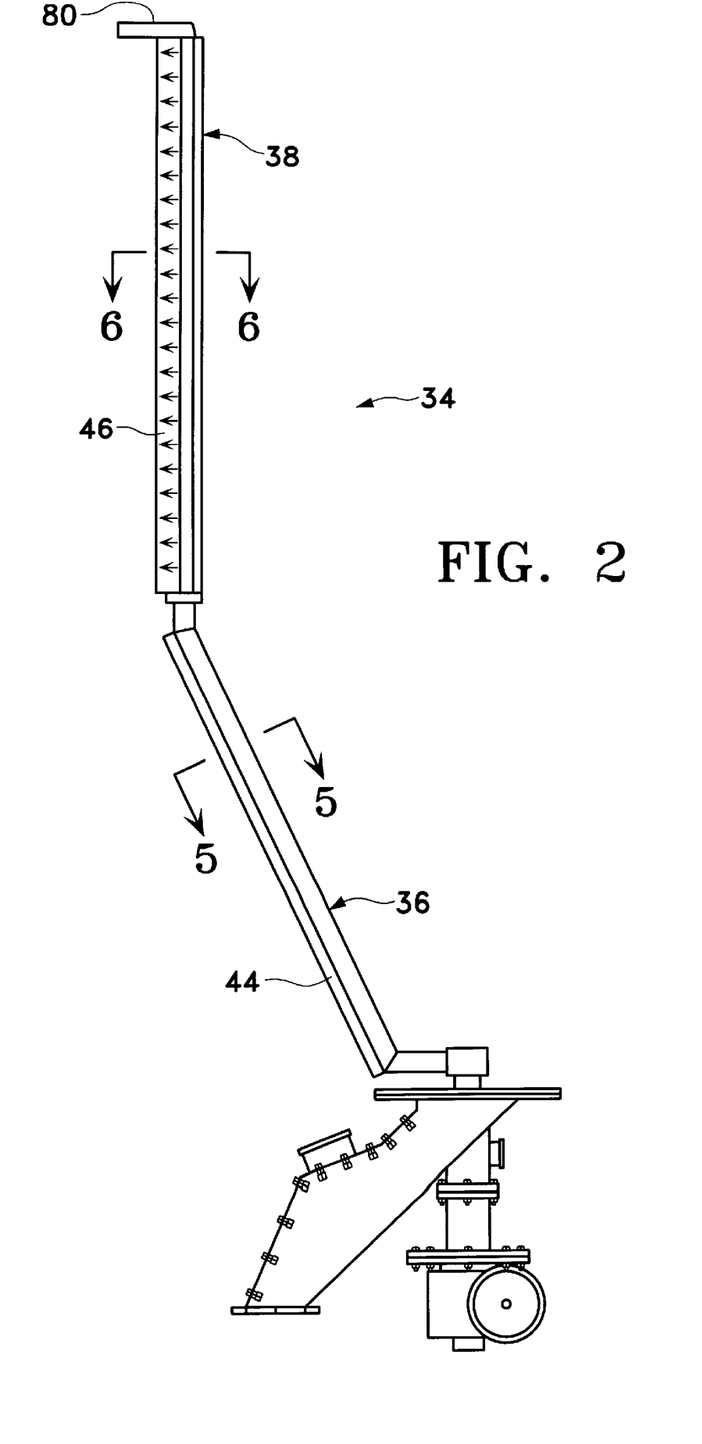
FIG. 2 shows the air-assisted wiping device in FIG. 1 without the housing of the continuous-type dryer.

Wiper 34 is in sliding contact with the inside surface of the walls of housing 12. To maintain an optimum cleaning efficiency of wiper 34, air, shown by arrows in FIG. 2, is directed to blow on wiper 34 to remove powder that may collect on wiper 34. This feature of the invention will be discussed in greater detail with reference to FIG. 6.

Wiper 34 is generally configured to substantially correspond to the interior shape of housing 12. As shown in FIGS. 1 and 2, wiper 34 has a first portion 36 corresponding to the shape of conical portion 16 of housing 12, and a second portion 38 corresponding to main portion 14 of housing 12. Wiper 34 is coupled to a motor 40 by way of a hollow T-coupling. Motor 40 serves two functions: 1) to rotate wiper 34 inside housing 12 so that wiper 34 continuously and cyclically wipes the inside surface of the walls of housing 12; and 2) to propel air into wiper 34 to clean it. A cap 80 (see FIG. 2) is provided on a distal end of wiper 34 to prevent escape of the fluid flow therethrough. A worm gear drive may be used to transfer rotational movement to wiper 34. Motor 40 pumps air drawn through an air inlet 42 into wiper 34. The rotational speed of wiper 34, and the velocity and pressure of air, may vary depending upon the type of powder being manufactured in dryer 10.

Referring now to FIG. 2, dryer 10 is shown with housing 12 removed to more clearly show wiper 34. Wiper 34 includes a first wiper blade 44 for first portion 36, and a second wiper blade 46 for second portion 38. First and second wiper blades 44 and 46 comprise a material that is durable and fairly stiff, but still pliable. A particularly preferred material for wiper blades 44 and 46 is a glass reinforced rubber. Wiper blades 44 and 46 must be made of a material sufficiently stiff so as to be capable of removing heavy, sticky powder from the inside surface of the walls of housing 12. Wiper blades 44 and 46 must also be sufficiently pliable so as to conform to slight variations and undulations (hills and valleys) commonly present in the walls of housing 12. Housing 12 is frequently made of a sheet metal material, which is inherently susceptible to variations in its topography, but also if damaged or dented during shipping and use. Wiper blades 44 and 46 of the present invention are preferably sufficiently flexible to conform to these variations in topography to therefore effectively clean the entire inner surface of the walls of housing 12. Wiper blades 44 and 46 are also preferably sufficiently stiff to remove sticky powder that has collected on the inside surface of housing 12.

Bristle brooms lack the stiffness required to remove the sticky powder, and rigid brooms cannot conform to the irregularities of the dryer walls. The reinforced flexible wiper blades 44 and 46 of the present invention, however, possess the unique combination of stiffness and flexibility necessary to remove sticky powder such as high fat powder from the wall of housing 12 of dryer 10.

Wiper blades 44 and 46 may also have beveled ends. By beveling the ends that contact housing 12, removal of the powder is facilitated and improved. In use, preferably, the outermost tip of the bevel is the leading edge.

Figure 3:
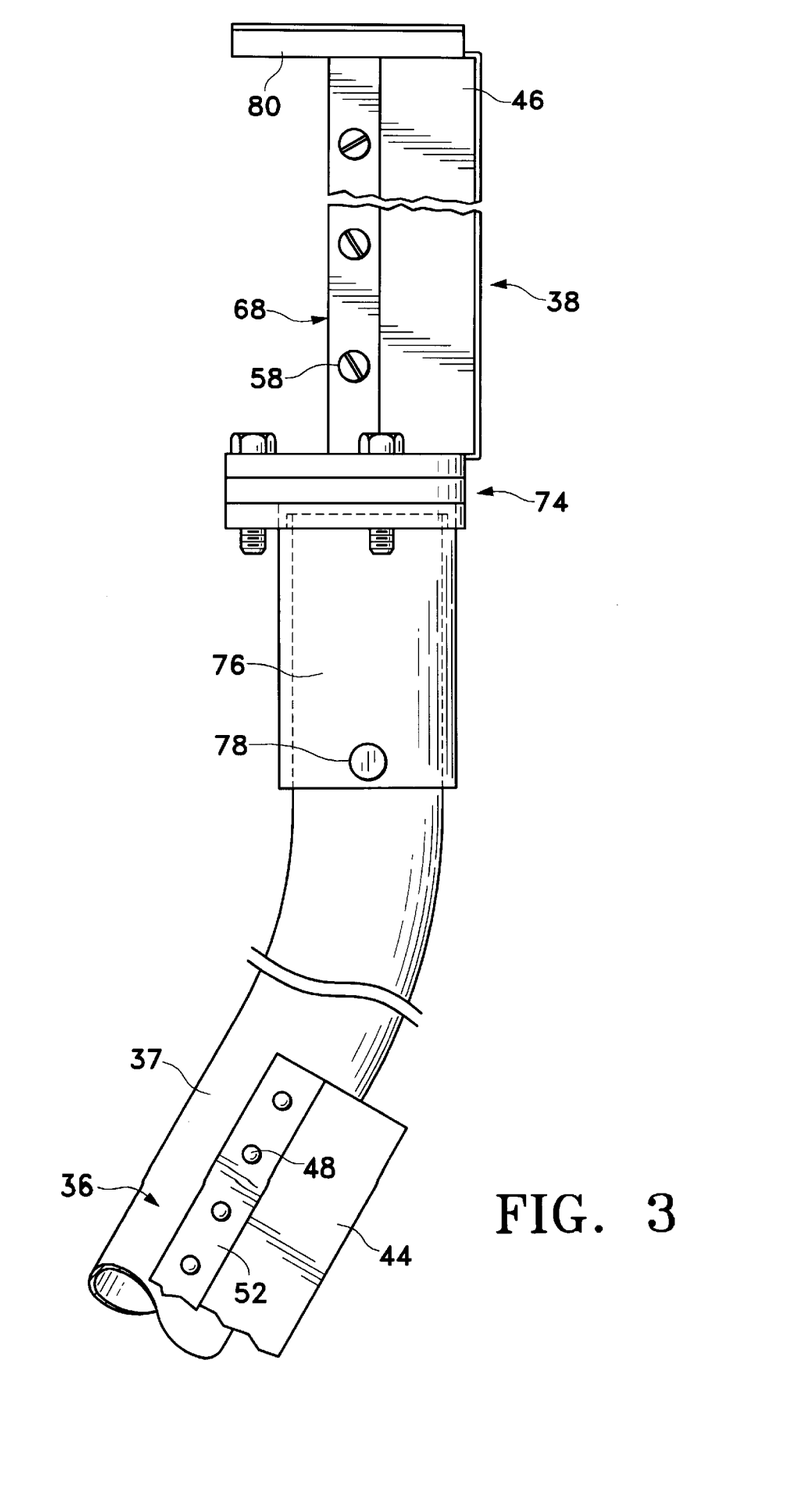
FIG. 3 shows a side view of the air-assisted wiping device of the present invention.
Figure 5:
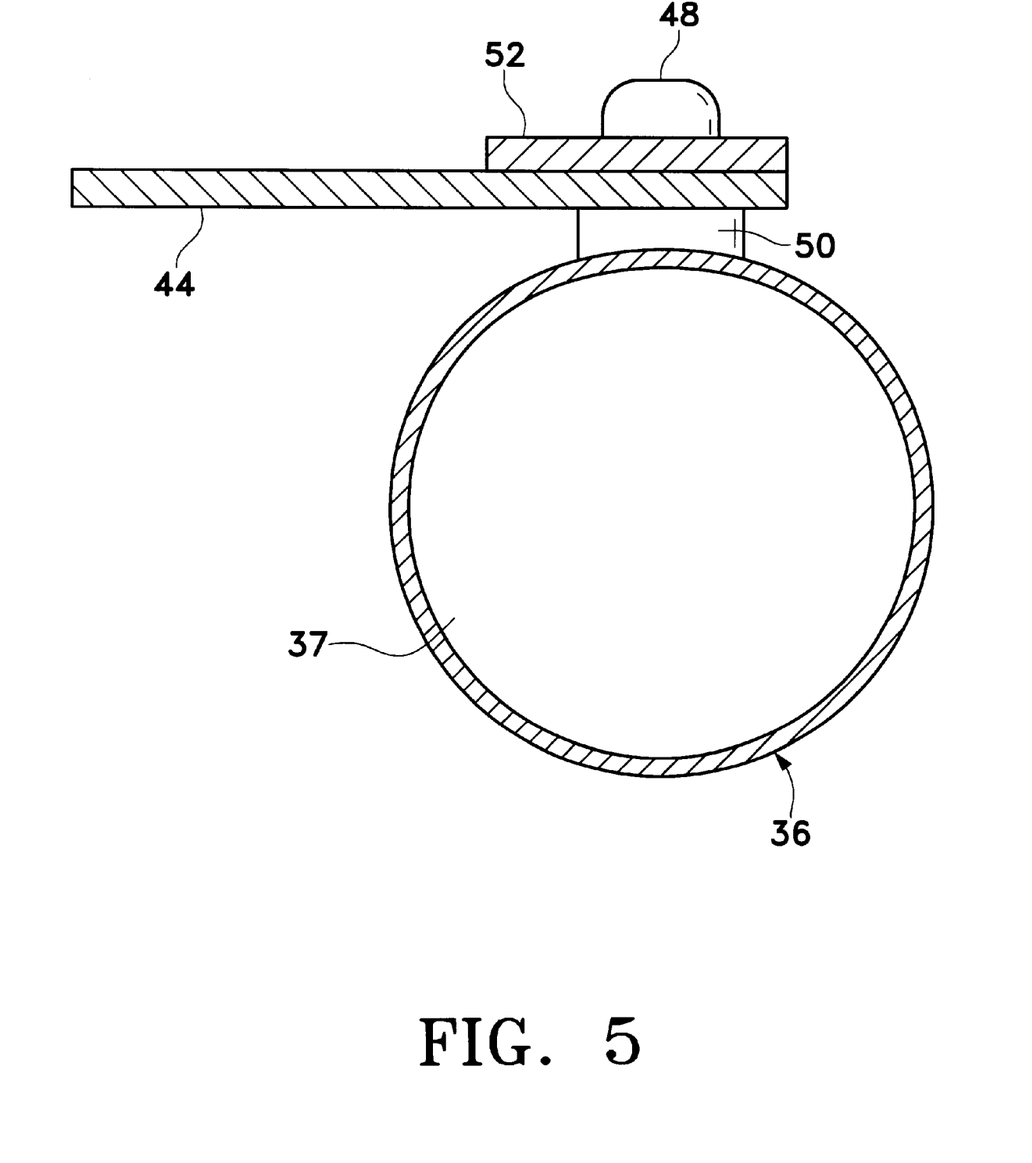
FIG. 5 shows a cross-sectional view taken along line 5—5 shown in FIG. 2.

First portion 36 of wiper 34 includes an elongated hollow cylindrical plenum 37, as illustrated in FIGS. 3 and 5. First wiper blade 44 is attached along its length to plenum 37. As shown by FIGS. 3 and 5 in combination, fasteners, such as a screw 48 and washer 50, are utilized to attach first wiper blade 44 to plenum 37. An elongated fastening plate 52 has a series of holes along its length to receive screw 48. Plate 52 facilitates attaching wiper blade 44 to plenum 37 and provides additional support and stability to a base or attaching end of wiper blade 44. Plate 52 is of a length substantially equal to a length of wiper blade 44 and may comprise a metal material such as steel. A wiping end of wiper blade 44 may comprise a beveled end to facilitate removal of the powder from the inside surface of the walls of housing 12.

Figure 6:
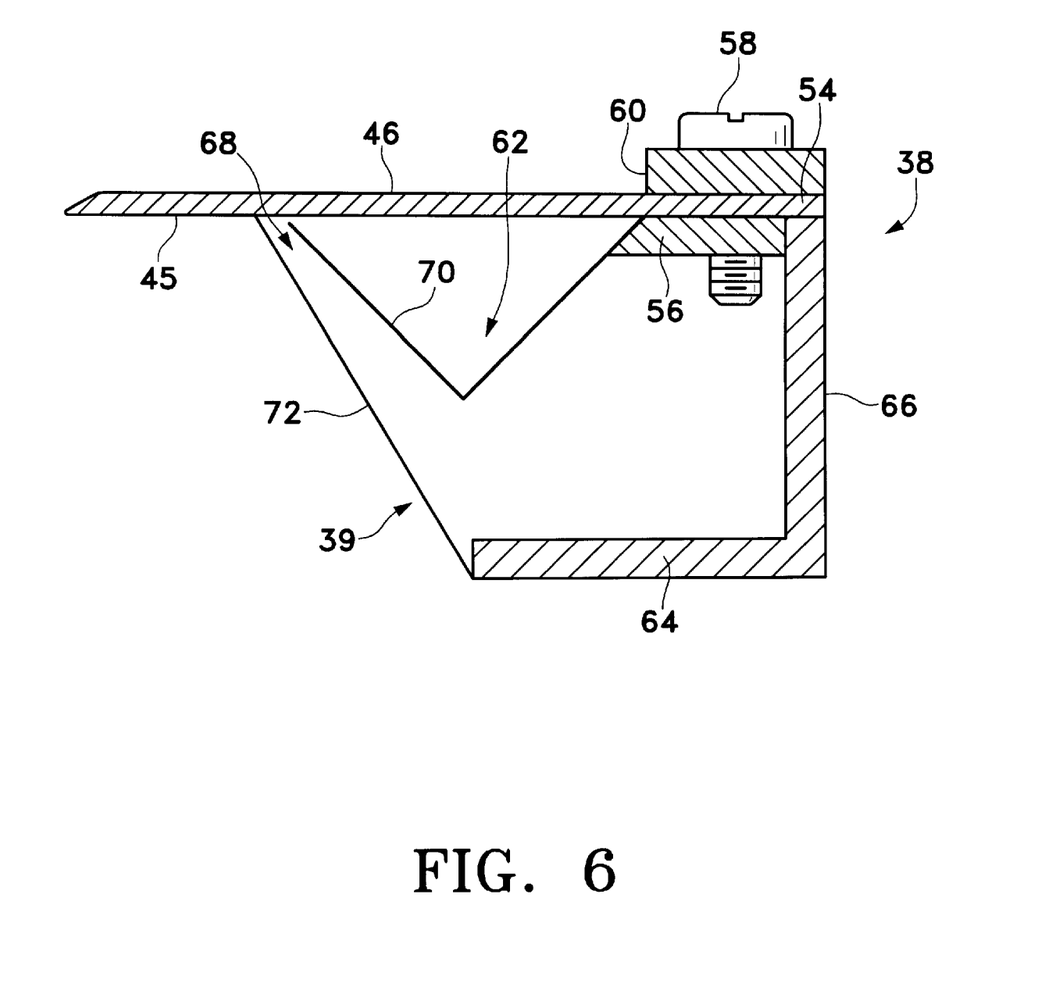
FIG. 6 shows a cross-sectional view taken along line 6—6 shown in FIG. 2.

Referring to FIG. 3 and FIG. 6, which show a cross-sectional view of second portion 38 of wiper 34, the mounting of second wiper blade 46 on second portion 38, and the discharge of air onto a leading side 45 of wiper blade 46 will be discussed. Second portion 38 is similar to first portion 36 in that it includes an elongated hollow plenum 39. Plenum 39, however, is configured in a unique geometric shape in cross-section and is provided with a longitudinally extending flow-directing slot 68. Plenum 39 includes a top wall having a connecting portion 54 and a recessed portion 62 adjacent to connecting portion 54.

Connecting portion 54 is connected to an attaching end of second wiper blade 46 by way of a fastener, shown as a nut 56 and bolt 58, and a fastening plate 60. Fastening plate 60 is similar to plate 52, and comprises an elongated plate having openings passing therethrough for receiving bolt 58.

Recessed portion 62 comprises a substantially V-shaped notch. Recessed portion 62 provides an open area in which second wiper blade 46 can flex and bend when second wiper blade 46 is drawn or dragged over the inner surface of the walls of housing 12. Generally, second wiper blade 46 curves inwardly into recessed portion 62. By enabling second wiper blade 46 to flex in this manner during use, the pressure on second wiper blade 46 is transferred over a length of the blade rather than on a single pressure point. Plenum 39 includes a rear wall 66 extending between and connecting portion 54 of the top wall and bottom wall 64.

Plenum 39 is substantially a closed elongated hollow member along its length except for slot 68. Slot 68 extends substantially along the entire length of plenum 39 of first portion 38 of wiper 34. Slot 68 is defined by a first flow directing extension 70, which is part of recessed portion 62 of the top wall of plenum 39; and a second flow directing extension 72 extending outwardly from bottom wall 64. First and second flow directing extensions 70 and 72 converge or taper toward each other to form a nozzle that accelerates the flow of air exiting plenum 39 via slot 68 along a flow path directed onto second wiper blade 46.

Wiper blade 46 is disposed adjacent to plenum 39 such that leading side 45 of second wiper blade 46 rests on connecting portion 54 of the top wall of plenum 39, and on distal ends of first and second flow directing extensions 70 and 72, which form slot 68 of plenum 39. As a result, fluid flow through second portion 38 of wiper 34 exiting from slot 68 is directed along a flow path, which is directed onto leading side 45 of second wiper blade 46. This allows for the removal of the powder from second wiper blade 46.

Figure 4:
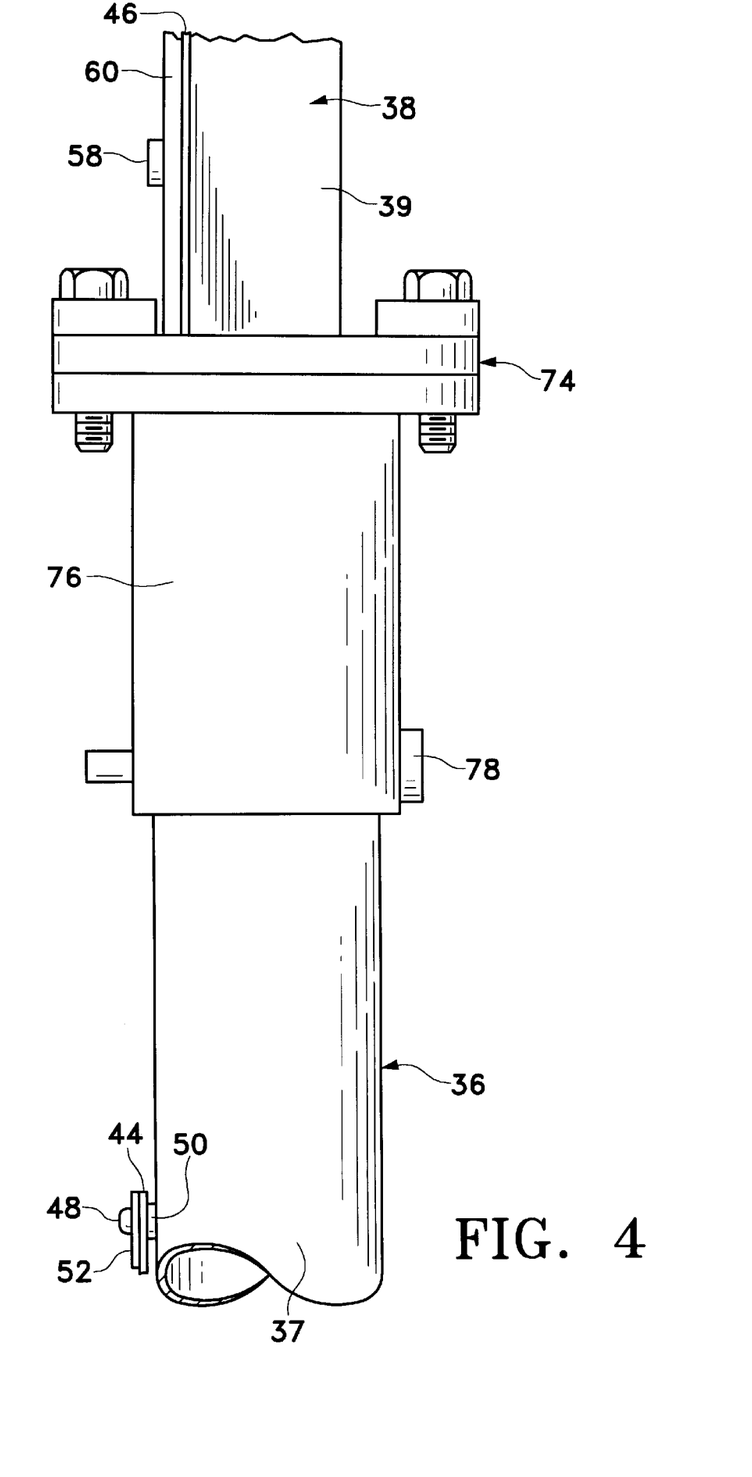
FIG. 4 shows another side view of a portion of the air-assisted wiping device of the present invention.

Referring to FIGS. 3 and 4, the connection of first portion 36 to second portion 38 is shown. Plenum 37 is connected to plenum 39 by conventional means so long as plenum 37 remains in fluid communication with plenum 39. As shown, plenum 39 is fixedly attached to plates 74 having openings passing therethrough, and a collar 76 having a transverse opening passing therethrough. Plenum 37 is also provided with a transverse opening passing therethrough. Collar 76 is slid over a free end of plenum 37 so that the openings are aligned, and a locking pin 78 is passed through collar 76 to fixedly connect plenum 37 and plenum 39. In final construction, plenum 37 is in fluid communication with plenum 39.

The air-assisted wiping device of the present invention results in improved-quality powder because powder is promptly removed from the dryer walls and is not subjected to prolonged heating. By doing so, the improved results such as reduced denaturing of proteins, higher solubility, reduced scorching, and reduced loss of desirable flavor volatiles are achieved. The air-assisted wiping device also provides an improved yield because powder is not wasted by sticking to the walls. Moreover, the overall efficiency of the dryer is improved because heat transfer from the wall to the powder is not impeded by powder buildup. In addition, the manual labor required to collect the powder produced in box or batch drying of heavy, sticky powders is eliminated.

In operation, the wiping device rotates slowly inside the housing of the continuous spray dryer. The wiping blade is in contact with the inner wall of the spray dryer. The wiping blade removes the powder from the wall while the slot in the plenum directs air at the leading side and edge of the wiping blade to keep it clear of powder accumulation. Since conventional air brooms use only air to remove powder from the walls of the dryer, high fat-content powders, which generally have a 35–80% fat content, cling too strongly to the walls of the dryer to be removed with air alone. Thus, the air-assisted wiping device enables high fat-content powders to be dried continuously.

While various embodiments of the present invention have been described above, it is understood that they have been presented by way of example only, and not limitation. For example, it is within the scope of the invention to vary the configuration of the flow-directing slot in the wiper, or the configuration of the wiper, to accommodate different shapes of continuous spray dryers. Thus, the breadth and scope of the present invention should not be limited by any of the above-described exemplary embodiments, but should be defined in accordance with the following claims and their equivalents.

We claim:

1. An air-assisted wiping device for use in a continuous spray dryer, comprising:

an elongated hollow plenum having an open distal end for receiving a fluid flow and a closed distal end opposite said open distal end for preventing exit of the fluid flow therefrom, wherein said elongated hollow plenum has a side and a flow directing slot is defined by said side, whereby the fluid flow in said elongated hollow plenum exits from said elongated hollow plenum through said flow directing slot along a flow path; and a wiper coupled to said elongated hollow plenum, wherein said wiper is positioned on said elongated hollow plenum in said flow path, whereby the fluid flow exiting from said flow directing slot cleans said wiper.

2. An air-assisted wiping device according to claim 1, further comprising:

a second wiper, wherein said elongated hollow plenum comprises a first section and a second section, wherein said second wiper is coupled to said first section and said first wiper is coupled to said second section, said flow directing slot being formed in said second section.

3. An air-assisted wiping device according to claim 1, wherein said elongated hollow plenum includes a main body portion, a first flow directing extension extending outwardly from said main body portion, and a second flow directing extension extending outwardly from said main body portion opposing said first flow directing extension, and wherein said first and second flow directing extensions taper toward each other as said first and second flow directing extensions extend further away from said main body portion of said elongated hollow plenum.

4. An air-assisted wiping device according to claim 3, wherein said first flow directing extension has a recess for receiving said wiper when said wiper deforms during use.

5. An air-assisted wiping device according to claim 3, wherein said wiper is disposed adjacent said flow directing slot and said wiper has a wiping end that is beveled.

6. An air-assisted wiping device according to claim 1, wherein said wiper comprises glass reinforced rubber.

7. An air-assisted wiping device according to claim 1, further comprising:
   a fluid flow supplier for supplying the fluid flow to said hollow elongated plenum; and
   a means for rotating said elongated hollow plenum.

8. A dryer for producing powder, comprising:
   a housing having an atomizing end and a discharge end gravitationally opposed to said atomizing end, wherein said discharge end includes an outlet conduit, wherein said housing has a heated interior area;

an atomizer device disposed at said atomizing end of said housing, said atomizer having an inlet for receiving a liquid and an atomizer for producing and discharging an atomized liquid into said housing, wherein said atomized liquid is dried as it passes through said heated interior area of said housing and is output as a powder into said outlet conduit; and a wiping device disposed in said housing, said wiping device comprising, an elongated hollow plenum disposed at said atomizing end of said housing, said elongated hollow plenum having an open distal end disposed at said discharge end for receiving a fluid flow and a closed distal end opposite said open distal end for preventing exit of the fluid flow therefrom, wherein said elongated hollow plenum has a side and a flow directing slot defined by said side, whereby the fluid flow in said elongated hollow plenum exits from said elongated hollow plenum through said flow directing slot along a flow path, and a wiper coupled to said elongated hollow plenum, wherein said wiper is positioned on said elongated hollow plenum in said flow path, whereby the fluid flow exiting from said flow directing slot cleans said wiper.

9. A dryer for producing powder according to claim 8, wherein said dryer is a continuous spray dryer.

10. A dryer for producing powder according to claim 8, further comprising:

a heater for continuously heating said heated interior area of said housing;

a fluid flow supplier disposed at said discharge end of said housing for supplying the fluid flow to said hollow elongated plenum; and a rotary device disposed at said discharge end of said housing for imparting a rotary movement to said elongated hollow plenum.

11. A dryer for producing powder according to claim 8, further comprising:

a second wiper, wherein said elongated hollow plenum comprises a first section and a second section, wherein said second wiper is coupled to said first section and said first wiper is coupled to said second section, said flow directing slot being formed in said second section.

12. A dryer for producing powder according to claim 8, wherein said elongated hollow plenum includes a main body portion, a first flow directing extension extending outwardly from said main body portion, and a second flow directing extension extending outwardly from said main body portion opposing said first flow directing extension, and wherein said first and second flow directing extensions taper toward each other as said first and second flow directing extensions extend further away from said main body portion of said elongated hollow plenum.

13. A dryer for producing powder according to claim 12, wherein said first flow directing extension has a recess for receiving said wiper when said wiper deforms during use.

14. A dryer for producing powder according to claim 12, wherein said wiper is disposed adjacent said flow directing slot and said wiper has a wiping end that is beveled.

15. A dryer for producing powder according to claim 8, wherein a portion of said housing adjacent said discharge end is conical to facilitate channeling of the powder produced in said housing into said outlet conduit.

16. A dryer for producing powder according to claim 8, wherein said wiper comprises glass reinforced rubber.

* * * * *